(12) United States Patent
Muench et al.

(10) Patent No.: US 11,460,852 B2
(45) Date of Patent: Oct. 4, 2022

(54) MODEL-BASED PREDICTIVE SPEED CONTROL OF A HARVESTING MACHINE

(71) Applicant: Deere & Company, Moline, IL (US)

(72) Inventors: Philipp Muench, Kaiserslautern (DE); Tobias Peschke, Neustadt (DE)

(73) Assignee: Deere & Company, Moline, IL (US)

( * ) Notice: Subject to any disclaimer, the term of this patent is extended or adjusted under 35 U.S.C. 154(b) by 235 days.

(21) Appl. No.: 15/868,241

(22) Filed: Jan. 11, 2018

(65) Prior Publication Data

US 2018/0196441 A1    Jul. 12, 2018

(30) Foreign Application Priority Data

Jan. 11, 2017   (DE) .......................... 102017200336.7

(51) Int. Cl.
  *G05D 1/02*      (2020.01)
  *A01D 41/127*    (2006.01)
  *A01F 12/44*     (2006.01)

(52) U.S. Cl.
  CPC ......... *G05D 1/0223* (2013.01); *A01D 41/127* (2013.01); *A01D 41/1274* (2013.01);
  (Continued)

(58) Field of Classification Search
  None
  See application file for complete search history.

(56) References Cited

U.S. PATENT DOCUMENTS

| 8,469,784 | B1 * | 6/2013 | Hoskinson | ........... | A01D 41/127 460/4 |
| 2005/0241285 | A1 * | 11/2005 | Maertens | ............... | A01D 41/12 56/1 |

(Continued)

FOREIGN PATENT DOCUMENTS

| DE | 1199039 B | 8/1965 |
| DE | 4431824 C1 | 5/1996 |

(Continued)

OTHER PUBLICATIONS

T. Coen et al, Cruise control using model predictive control with constraints, dated Mar. 5, 2008, pp. 11, Computers and Electronics in Agriculture 63.

(Continued)

*Primary Examiner* — Lail A Kleinman
(74) *Attorney, Agent, or Firm* — Hanley, Flight & Zimmerman

(57) ABSTRACT

In one example, a system for automatic control of the propulsive speed of a harvesting machine is provided. The system comprises a throughput sensor for determining an expected rate of crop harvested by the harvesting machine in dependence on a position of the harvesting machine and a conversion device configured to calculate a sequence of expected positions of the harvesting machine and, with the expected rate of crop harvested at a position of the harvesting machine, determine a predicted rate of crop harvested by the harvesting machine at the sequence of expected positions of the harvesting machine for use in an optimization problem. Further provided is a speed control device, configured to receive the data relating to the predicted rate of crop harvested at the sequence of expected positions in addition to at least one of data relating the operating state of the harvesting machine, cost function data or secondary condition data, to solve the optimization problem and generate at least one timewise successive sequence of speed commands for setting the propulsive speed of the harvesting machine; and an actuator configured to adjust the propulsive speed of the harvesting machine, the actuator receiving the first speed command of each sequence of speed commands and adjusting the propulsive speed of the harvesting machine.

25 Claims, 3 Drawing Sheets

(52) U.S. Cl.
CPC .......... *G05D 1/0217* (2013.01); *A01F 12/446* (2013.01); *G05D 2201/0201* (2013.01)

(56) References Cited

U.S. PATENT DOCUMENTS

| | | | |
|---|---|---|---|
| 2014/0338298 A1* | 11/2014 | Jung | A01D 41/1274 56/10.2 R |
| 2016/0078611 A1* | 3/2016 | Butts | A01D 57/12 382/110 |
| 2017/0311544 A1* | 11/2017 | Ikeda | A01D 67/00 |

FOREIGN PATENT DOCUMENTS

| | | |
|---|---|---|
| DE | 10130665 A1 | 1/2003 |
| DE | 102014205233 A1 | 9/2015 |
| DE | 102014208068 A1 | 10/2015 |
| EP | 2060165 A1 | 5/2009 |
| EP | 2764764 A1 | 8/2014 |
| EP | 3085221 A1 | 10/2016 |

OTHER PUBLICATIONS

T. Coen et al, Throughput control on a combine harvester using Model-based Predictive Control, dated Jun. 23, 2010, pp. 12, ASABE Annual International Meeting, Pittsburgh, Pennsylvania USA.

Tom Coen, A Stochastic MPC approach to controlling biological variable processes, pp. 6, University Leuven, Minervastraat 2, 1930 Zaventem, Belgium.

European Search Report issued in counterpart application No. 18150716.1 dated Apr. 12, 2018. (9 pages).

Peschke, Predictive Control of Agricultural Machines, Bachelor Thesis JEM-BA15/02, Oct. 15, 2015, 90 pages, Technical University of Kaiserslautern, Kaiserslautern, Germany.

* cited by examiner

MODEL-BASED PREDICTIVE SPEED CONTROL OF A HARVESTING MACHINE

RELATED APPLICATIONS

This document claims priority based on German Patent Application No. 102017200336.7, filed on Jan. 11, 2017, which is hereby incorporated by reference into this application.

TECHNICAL FIELD

The present disclosure concerns a system for control of the propulsive speed of a harvesting machine.

BACKGROUND

Agricultural harvesting machines serve to harvest plants from a field. As a rule, processes take place in the harvesting machine so as to treat the crop for purposes of subsequent further processing. For instance, the crop is chopped in a field chopper and threshed, separated, and cleaned in a thresher. The drive of the harvesting machine takes place via a drive motor, which is usually a (diesel) combustion engine. The drive engine drives the soil engagement means (wheels or caterpillar tracks) of the harvesting machine via a first drive train and the crop processing and/or conveying means of the harvesting machine via a second drive train.

There are various known approaches to controlling the propulsive speed of a harvesting machine automatically so as to ensure that the available power of the drive engine is utilized as optimally as possible, i.e., the harvesting machine does not travel too slowly and does not operate uneconomically, but also does not travel too fast and overload the drive engine or plug the crop processing elements if the throughputs are too high. A relatively simple approach is to measure the current crop throughput in the harvesting machine and to compare it to a desired crop throughput so as to generate a regulating variable for a speed setting device (see German Patent Application No. DE 1 199 039 B1). Later it was proposed to calculate the expected throughput predictively on the basis of prior harvesting operations in order to adjust the propulsive speed ahead of time, before a greater change of the crop throughput may be expected (German Patent Application No. DE 44 31 824 C1), or sensors on the harvesting machine that sense the crop in front of (German Patent Application No. DE 101 30 665 A1) or next to (German Patent Application No. DE 10 2014 208 068 A1) the harvesting machine are used, and then the speed of the harvesting machine is predictively planned and adjusted on this basis.

In setting the speed of the harvesting machine, various boundary conditions must be observed in addition to the crop throughput. Besides the properties of the harvesting machine (for example drive power, traction properties for a given terrain, loss curve in the case of threshers), these include, for example, operator comfort, since as far as possible the driver of the harvesting machine should not be subjected to forward and backward accelerations that are too great. German Patent Application No. DE 10 2014 205 233 A1 proposes in this regard to preplan the speed of the harvesting machine in a way that considers preset acceleration minima and maxima, using a known, expected crop stand density. In this case first the speed is preplanned using the expected crop throughput and a recalculation of the speed is made in the case where the acceleration would be larger or smaller than a maximum.

Another approach to determining the establishment of the propulsion of a harvesting machine lies in specifying a predictive, model-based control, i.e., model predictive control or MPC. See T. Coen et al., Cruise Control Using Model Predictive Control with Constraints, Computers and Electronics in Agriculture, October 2008, Vol. 63, Issue 2, p. 227-236. The combustion engine and the hydrostatic drive of the thresher are represented by a nonlinear mathematical model in a control system and one seeks to minimize costs, where changes of the engine speed and pump setting are considered as input costs. In order to achieve as low as possible an engine speed during road travel, an additional penalty term in the form of the engine speed is input to the target function, in addition to the input costs (which represent the comfort of the driver) and an error term, which represents the deviation between the desired and the actual travel speed of the thresher. Moreover, limits for the engine speed and pump setting are taken into account. Thus, an optimization problem is solved and ultimately an optimal setting for the engine speed and the pump setting is found.

Later this approach was broadened to the extent that the speed of the thresher is also optimized in terms of achieving a desired throughput by means of a model-based control system. See T. Coen et al., Throughput control on a combine harvester using Model-based Predictive Control, 2010 ASABE Annual International Meeting, Pittsburgh, Pa., Jun. 20-Jun. 23, 2010. The throughput is measured by means of the travel speed, the conveyor rate, the engine load, and/or the grain flow flowing into the grain tank, and changes of the pump setting to limit the changes of the propulsive speed for purposes of achieving an operator comfort, the travel speed, the transport rate of the crop into the harvesting machine, and the engine load are taken into account as secondary conditions. The model-based control system takes into account the crop throughput in the form of a stochastic quantity.

European Patent Application No. EP 3 085 221 A1 describes a harvesting machine with a control system in which are stored characteristic curves for the operation of the harvesting machine. The control system is linked to a predictive sensor for detection of the properties of the crop in front of the harvesting machine and optimizes the setting of the threshing devices of the harvesting machine and the propulsive speed, in that the optimum setting is determined by means of the characteristic curve.

The procedure according to German Patent Application No. DE 10 2014 205 233 A1 is relatively complicated, since it requires revision of the speed when the crop stand density changes. The optimization according to Coen et al. (2008) was conceived only for road travel and cannot take into account various crop stand densities, while the procedure of Coen et al. (2010) takes into account the crop throughput not on the basis of a measurement, but rather only on the basis of a stochastic parameter, and therefore cannot operate very precisely, and the procedure according to European Patent Application No. EP 3 085 221 A1 is based on engine characteristics, which are costly to determine beforehand.

The present disclosure has the aim of avoiding the said disadvantages at least in part.

BRIEF DESCRIPTION OF THE DRAWINGS

The detailed description of the drawings refers to the accompanying figures in which.

DETAILED DESCRIPTION

Figure 1:
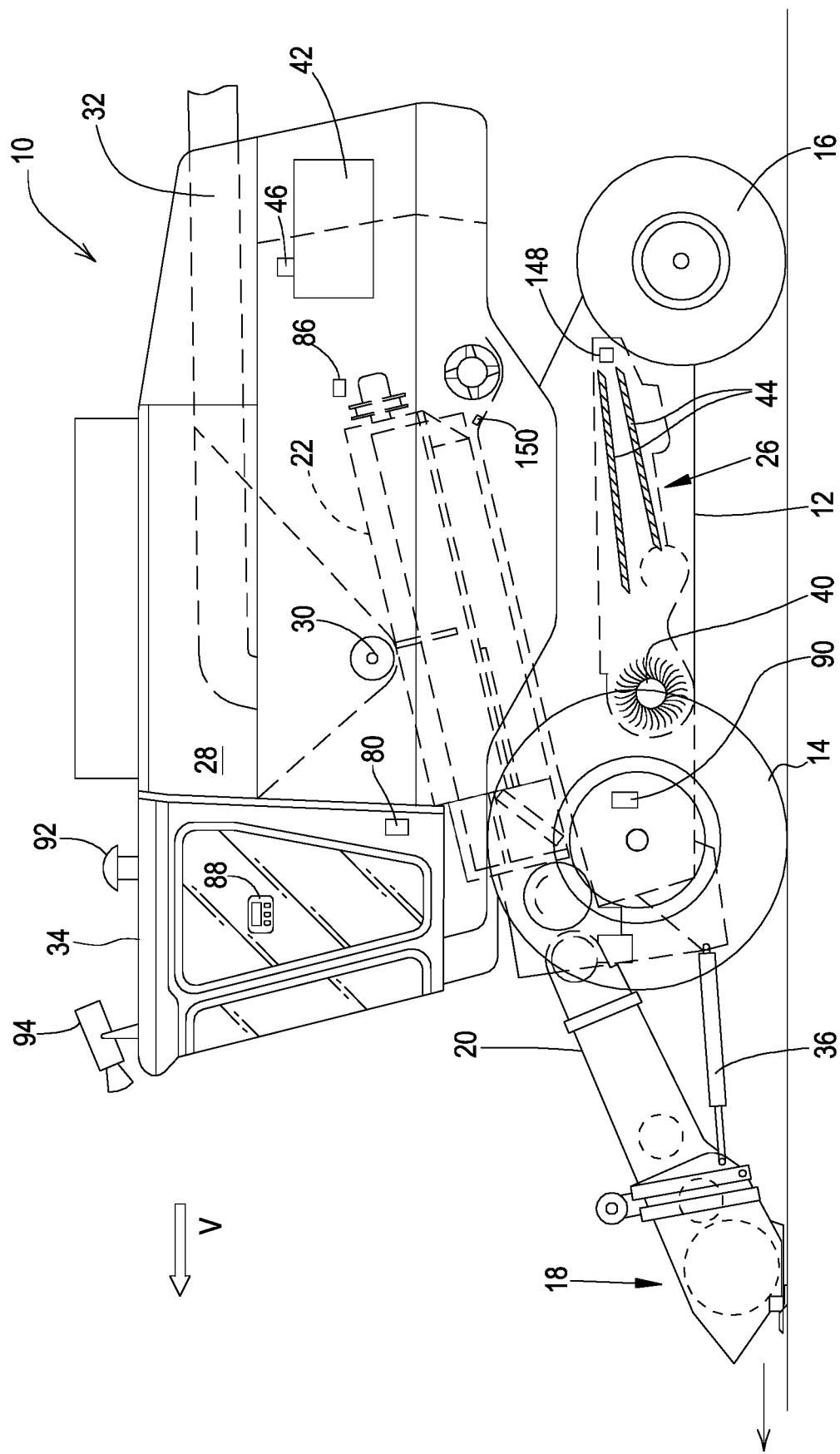
FIG. 1 shows a schematic side view of an agricultural harvesting machine in the form of a thresher.

In general, the model-based control of the propulsive speed of the harvesting machine operates so that first an optimization problem is established by means of a dynamic (mathematical) model of the harvesting machine or its operating state and by means of a cost function. Said cost function assigns higher costs to undesired machine states than to desired machine states and also takes into account secondary conditions. A problem solver makes available a planning of the control variable (in the case of the thresher this is usually a quantity that is connected with a change of travel speed), which [problem solver] contains a sequence of proposed commands. Accordingly, a formulation of the load control of the drive engine of the harvesting machine takes place as an optimization problem while taking into account secondary conditions. In this way a holistic optimization of various control quantities (such as a throughput-dependent quantity, which can be the drive torque of a crop processing device (threshing rotor), drive engine power, grain losses) can take place while weighting the individual control quantities and a quantity that determines the driving comfort (sum of the speed changes). The optimization software calculates an optimized travel speed over a certain planning horizon (predictive time period) by means of the model, where in particular the throughput-dependent quantity, the drive engine power, and/or the grain loss are included while taking into account the said weighting factors.

In the definition of the cost function and the optimization problem the expected, predictively determined throughput is also taken into account, in addition to the measured and/or observed machine states, which concern, for example, the current flow rate of the crop and/or the work load of the drive engine. The solution of the optimization problem takes place in a time range, in order to generate a timewise sequence of proposed commands. Of this sequence only the first command is carried out in each case. Thus, as input value one requires information regarding the expected throughputs as a function of time. However, one only has available information on the crop stand density or the relevant throughput as a function of the site on which the crop is found, the mass density of which was determined beforehand by sensors or by means of model-based calculations. A direct conversion of the known, site-dependent throughput to a time-dependent throughput that is to be determined, however, is not possible, since at a time point the future speed of the harvesting machine is not yet known, since it has not yet been determined by the algorithm.

For this reason it is proposed to calculate a sequence of expected positions of the harvesting machine, in particular by means of the sequence of planned speeds of the harvesting machine and measured and/or observed machine states, and to employ said positions for calculation of the expected throughputs as a function of time or site and to enter said time- or site-dependent throughputs into the optimization problem. In this case a speed model representing the physical properties of the harvesting machine can be employed.

The control device can take into account machine states that are measured and/or observed as quantities describing the operating state of the harvesting machine, for instance the current rate of crop discharged from the harvesting machine and/or the work load of a drive engine of the harvesting machine.

The control device can, as noted above, implement a predictive, model-based control through optimization of the cost function. For this the cost function can be represented as a function of the state, the output quantities, and the input quantities of the harvesting machine and, taking into account restrictions on the input quantities (which represent the above noted, at least one secondary condition), various input quantities are run through the predictive time period and in doing so the states and output quantities are predicted over a predictive time period, and in each case the first input quantity of an optimized sequence of input quantities is output as optimized operating parameter. The underlying model can be present in various degrees of detail and can also take into account, for example, thresher settings, the gradient of the terrain in the forward and/or transverse direction, the grain loss associated with the expected throughput, the state of fill of the grain tank and/or the type of crop and/or the state of the crop and/or the achieved quality of the harvested material (broken kernels, contaminants).

Preferably a disturbance monitor is provided, which is designed to recognize possible deviations between an expected rate of harvested crop and the actual rate of harvested crop and to use this to correct the cost function.

The control device can be programmed to take into account, as a limitation of the input quantity, a maximum crop throughput and/or maximum loss and/or an available drive power and/or a maximum amount of acceleration and/or a maximum amount of the time derivative of the acceleration ("jerk") and/or a maximum propulsive speed.

The control device can be programmed to estimate one or more of the quantities representing the operating state of the harvesting machine and/or quantities representing the physical properties of the harvesting machine by means of measured values using a path model and/or a monitor for machine states that are not directly observable and to input them to the optimization problem. Since the optimization and planning is carried out anew over the predictive time period for each scanning step and is adjusted by means of the deviation between the values derived from the path model or the model used by the monitor and the relevant measured sensor values, the target values of the control quantities are achieved even if there are permanent deviations between the model and the actual values.

A weighting of the individual control quantities and/or a quantity determining the driving comfort that is taken into account by the control device can be entered by means of an operator input device. The weightings can be presented to the driver in the form of a virtual slide control and thus let him visually enable the weighting between performance-dependent-quantities (for example, maintenance of the set values regarding throughput, work load of the drive engine, and/or grain losses) and comfort (accelerations of the harvesting machine), and/or weighting of the performance-dependent quantities. In the setting of the propulsive speed, the input weighting is appropriately taken into account by the control device.

The harvesting machine can be designed as a threshing machine or field chopper.

Harvesting Machine

FIG. 1 shows a self-propelled harvesting machine 10 in the form of a thresher with a vehicle chassis 12, which is supported on the ground by driven front wheels 14 and steerable rear wheels 16 and is moved forward by said wheels. The wheels 14, 16 are set into rotation by means of the drive means shown in FIG. 2, in order to move the harvesting machine 10, for example, over a field that is to be harvested. Below, directional information such as forward and backward refers to the direction of travel V of the harvesting machine 10 in harvesting operation, which runs to the left in FIG. 1.

A harvesting attachment 18 in the form of a cutting device is separately connected to the front end region of the harvesting machine 10 in order to harvest crop in the form of cereal grain or other threshable crop from the field in harvesting operation and to feed it upward and to the rear through an inclined conveyor assembly 20 to an axial threshing unit 22. The mixture containing grains and contaminants, which passes through threshing concaves and grates in the axial threshing unit 22, goes to a cleaning device 26. Grain cleaned by the cleaning device 26 is sent by means of a grain auger to a grain elevator, which transports it to a grain tank 28. The cleaned grain can be discharged from the grain tank 28 through a discharge system with a transverse auger 30 and a discharge conveyor 32. The said systems are driven by means of a combustion engine 42, with which an engine control system 46 is associated, and can be monitored and controlled by an operator from an operator cab 34, for which purpose an operator interface 88 is provided.

Hardware for Speed Control

Figure 2:
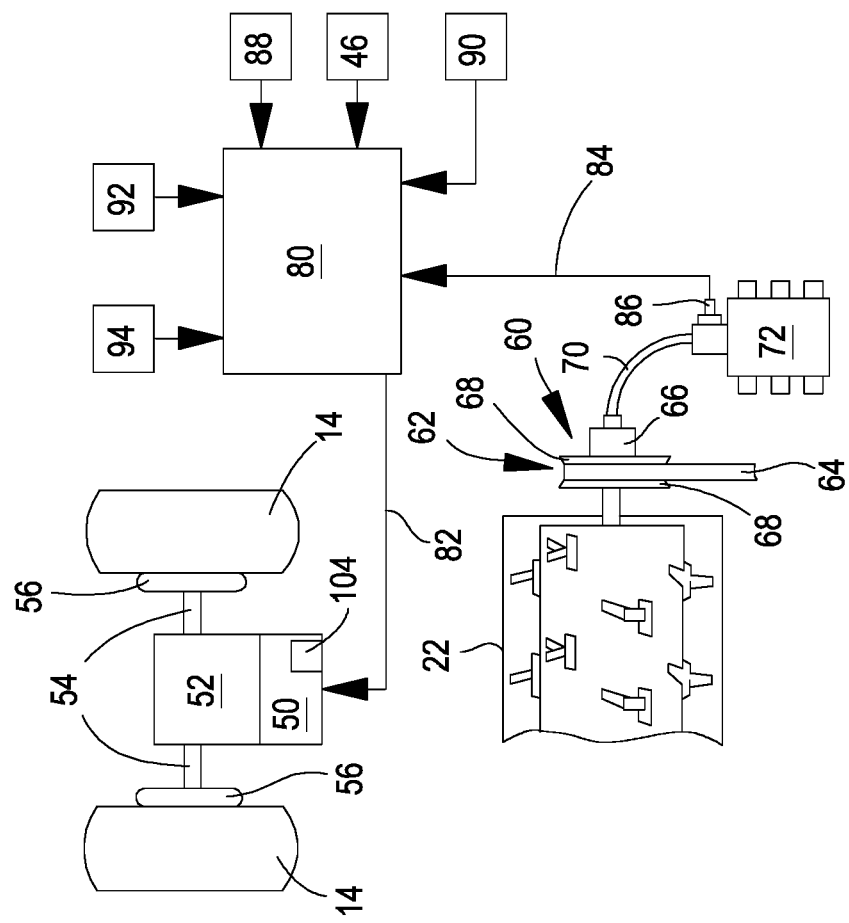
FIG. 2 shows a block diagram of a system for controlling the propulsive speed of the harvesting machine in FIG. 1.

One is now referred to FIG. 2. The front wheels 14 of the harvesting machine 10 are driven by a hydrostatic transmission 50. The hydrostatic transmission 50 is driven in the conventional way by the combustion engine 42. The hydrostatic transmission 50 in turn drives a manual transmission 52. Two drive shafts 54 extend from manual transmission 52 outward and drive the end drives 56 of the front wheels 14. The hydrostatic transmission 50 comprises a pump unit and an engine unit, where the pump unit could also be disposed at a distance from the engine unit. The pump unit and/or the engine unit are outfitted with adjustable wobble plates. The adjustable wobble plates control the output speed of the transmission 50 and its direction of rotation. Electromagnetically controlled control valves 104 control the positions of the wobble plates. The steerable rear wheels 16 could also be driven by wheel motors, which are attached directly to the wheels 16. The speed of the wheel motors can likewise be controlled via the throughput control system described below.

An adjustable drive 60 with variable torque drives the rotor of the axial threshing unit 22. The same combustion engine 42, which also drives the hydrostatic transmission 50, also drives the adjustable drive 60. The adjustable drive 60 is a belt drive, which goes around a drive pulley (not shown) with variable diameter and a driven pulley 62 with variable diameter. A belt 64 stretches between the drive pulley and the driven pulley 62 in order to transmit rotary power. Hydraulic cylinders control the diameter of the pulleys. The hydraulic cylinder 66 is coupled to the driven pulley 62 and moves the face plate 68 of the driven pulley 62 inwardly or outwardly, in order to control the effective diameter of the driven pulley 62 with respect to the belt 64. The effective speed of the driven pulley 62 is changed by a change of the effective diameter of the pulleys. Pressurized hydraulic fluid is supplied from a valve assembly 72 to the hydraulic cylinder 66 via a hydraulic line 70. The rotor of the axial threshing unit 22 is driven at a constant, selectable rotor speed by the variable-diameter pulleys. The torque transmitted by the belt 64 and pulleys varies with the material throughput.

An electronic control unit 80 controls the propulsive and thus the harvesting speed of the harvesting machine 10. This means that the electronic control unit 80 adjusts the forward speed (harvesting speed) of the harvester 10 by an adjustment of the position of the wobble plates of the hydrostatic transmission 50, by controlling the operation of the electromagnetically actuated control valves 104 via a line 82. The control unit 80 senses a current hydraulic pressure signal from a hydraulic pressure sensor 86 via line 84. The hydraulic pressure sensor 86 senses the hydraulic pressure of the hydraulic cylinder 66, which adjusts the drive 60 with variable torque. It was found that the hydraulic pressure with which the hydraulic cylinder 66 adjusts the drive 60 is unambiguously related to the throughput. The control device 80 accordingly is supplied by line 84 with a signal that contains information regarding the actual crop throughput of the harvesting machine 10. In addition, the control unit 80 receives, from a speed sensor 90, signals concerning the actual propulsive speed V of the harvesting machine 10. The speed sensor 90 can, for example as a radar sensor, register the speed of the harvesting machine 10 with respect to the ground or the speed of rotation of one of the front wheels 14. In addition, the control unit 80 is sent a signal concerning the power that is output by combustion engine 42 and that can be made available by the engine control system 46 and that can refer to its fuel consumption and/or a torque measurement at the crankshaft of the combustion engine 42. Also, the operator interface 88 is connected to the control unit 80.

Software for Speed Control

Figure 3:
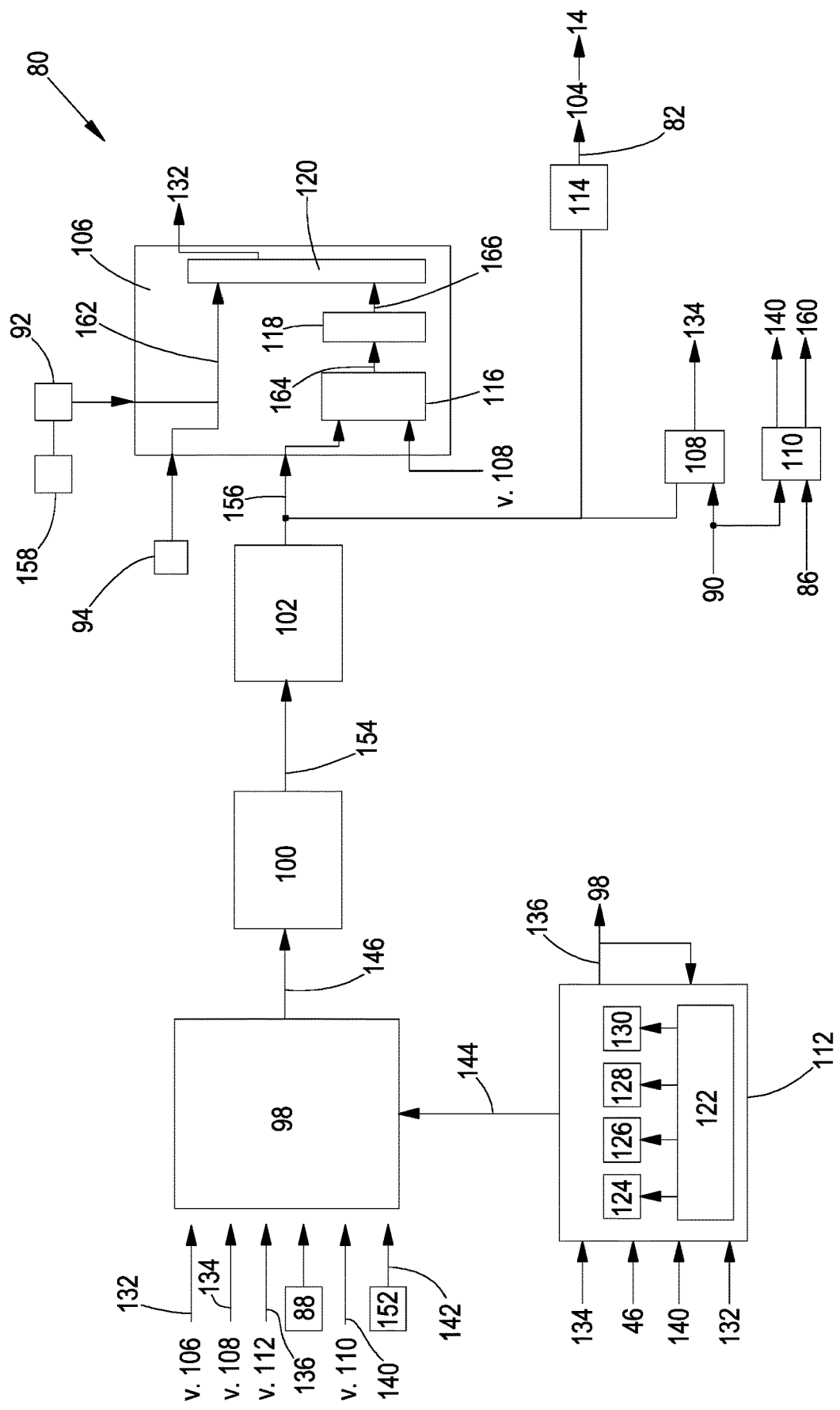
FIG. 3 shows a detailed diagram of the control device of the system in FIG. 2.

FIG. 3 shows the structure of the control device 80 in more detail. It comprises a device 98 for specifying an optimization problem and a cost function, a solving device 100, a speed setting device 102, a conversion device 106, and a control device 114 for controlling the control valves 104.

The device 98 for specifying the optimization problem and the cost function serves to implement a model-based, predictive regulation of the propulsive speed of the harvesting machine 10. It contains a processor or the like, which is programmed to specify an optimization problem and an associated cost function by means of quantities describing the relevant operating state of the harvesting machine 10 and at least one secondary condition.

The device 98 is sent, as input value, a time-dependent prediction 132 of the rate of harvested crop, which is made available by the conversion device 106, which is described in more detail below. In addition, the device 98 is sent, as input value, quantities 134 that are dependent on the relevant operating state of the harvesting machine 10, which can be measured directly by sensors of the harvesting machine 10, for example by a grain loss sensor 148 at the end of the upper screen of the cleaning unit 26 and/or a grain loss sensor 150 at the outlet of the axial threshing unit 22 and/or a returns sensor (not shown) for detection of the amount and/or the fraction of grain in the returns, which transports under-threshed material from the lower screen of the cleaning unit 26 back to the axial threshing unit 22 or to a separate post-thresher, and/or the speed sensor 90, and/or a load of the drive engine 42 provided by the engine control 46 and/or a measured value provided by hydraulic pressure sensor 86 and/or another sensor value for the relevant crop throughput, and/or which (if the grain loss sensors 148, 150 are omitted) can be estimated by a monitor 108 for machine states that cannot be directly observed. In addition, the device 98 is sent an expected time course of a control quantity 136 (to be optimized), which can be, for example, the load of the combustion engine 42, which is estimated by a machine modeling module 112 and is made available to the device 98.

The device 98 is additionally sent data 138, which enable a weighting of the parameters contained in the cost function. Said data 138 can at least in part be able to be entered via the operator interface 88, so that an operator can, for example, choose if comfort (i.e., a limitation of the maximum accelerations and decelerations of the harvesting machine 10 that occur in operation and/or a quantity derived therefrom, which, for example, can correspond to a time integral of the root of the squared accelerations) or an optimum work load of the harvesting machine 10 is more important to him. Alternatively or additionally, the operator can select which performance parameters of the harvesting machine 10, such as work load of the drive engine 46, throughput and/or losses are important to him. For this the operator interface 88 can have a selection option, which allows the operator to move a virtual slide control or rotary knob on a touch-sensitive screen of the operator interface for purposes of the described entry or to enter the data 138 in any other way. The data 138 for weighting the cost function are converted to weight matrices for the cost function by the device 98 (or another part of the control device 80).

In addition, the device 98 is optionally sent a biomass error 140, which is provided by a disturbance monitor 110. Said biomass error 140 enables the device 98 to make possible corrections to the predictions 132 of the throughput of the harvesting machine 10 that are provided by the conversion device 106. For this the disturbance monitor 110 is sent a signal from hydraulic pressure sensor 86 and a signal from speed sensor 90, by means of which the disturbance monitor 110 computes the harvested crop rate and sends the biomass error 140 as an error value to device 98 while taking into account the prediction 132. The disturbance monitor 110 additionally outputs an error value 160, which represents a difference between the expected and observed pressure at hydraulic pressure sensor 86 and can be used by the device 98 or the control 80, for example to correct the setting of the control valves 104 through the control device 114 or possibly to make available an error signal if there are larger deviations.

The device 98 is additionally sent data 142 regarding secondary conditions, which can represent, for example, limit values of the harvesting machine 10 such as maximum speed, maximum acceleration and deceleration, maximum throughput or maximum pressure at hydraulic pressure sensor 86. Said data 142 can be permanently stored in a memory 152 or (preferably only if administrator rights exist) can be input partly or entirely by means of the operator input device 88.

A machine modeling module 112 is supplied with the quantities 134 that are dependent on the relevant operating state of the harvesting machine 10, the current load of the drive engine 42, which is provided by the engine control 46, the biomass error 140, and the prediction 132. The machine modeling module 112 comprises an estimator 122 for model parameters, to which are sent the expected quantities 134, the load of the drive engine 42 from the engine control 46, 140, and 132, and which estimates, by means of these quantities, parameters for one or more path modules, which here are a speed model 124, an engine load model 126, a rotor pressure model 128, and/or a grain loss model 130, and possibly other models (not shown). The said models 124, 126, 128, and/or 130 use the parameters calculated by estimator 122 in order to supply the device 98 in operation with the expected calculated data 144 regarding the expected course of speed over a time horizon representing a prediction time period, the expected engine load of the drive engine 42 over a time horizon, the expected pressure at the hydraulic pressure sensor 86 (and/or any other value indicating the expected crop throughput) over a time horizon, and/or the expected grain loss over a time horizon. Said data 144 are taken into account by the device 98 in specifying the optimization problem and the cost function. The machine modeling module 112 additionally outputs the value 136 for the expected load of the drive engine 42 over a time horizon to the device 98 and takes into account said load in estimator 122 as well.

In operation the device 98 calculates the quantities for an optimization problem and an associated cost function. In this regard one is generally referred to Coen et al. (2008 and 2010) that was mentioned previously and the references cited there, the content of which is incorporated by reference in its entirety. The optimization problem represents a model (defined by data 144) of the harvesting machine 10 and is dependent on its relevant operating state. The cost function associates desired operating states with lower costs [rather] than undesired operating states. The quantities of the optimization problem and the associated cost function are as a whole indicated as 146 and sent to the solving device 100, which generates a sequence of command quantities 154, which solves the optimization problem and minimizes the associated cost function. The sequence of target quantities 154 is a timewise successive sequence of command quantities, which contain information concerning the speed of the harvesting machine. The sequence of command quantities 154 can be relative values, for example values corresponding to a position of a manually operated speed setting means (pedal or hand lever).

The sequence of command quantities 154 is sent by the solving device 100 to the speed setting device 102, which converts the sequence of commands 154 to a sequence 156 of absolute speeds. In each case only the first value of the sequence 156 is sent to the control device 114, which outputs positioning commands to the control valves 104 via wire 82.

The sequence of command quantities 156 is additionally sent by the speed setting device 102 to a monitor 108 for machine states that are not directly measurable, and values from the speed sensor 90 are also sent to said monitor. Said monitor 108 outputs the above-mentioned quantities 134, i.e., it can also obtain input values from other sensors 148, 150. The quantities 134 are, as described, sent to the device 98, the conversion device 106, and the machine modeling module 112.

The device 98 requires, as described above, a time-dependent prediction 132 of the rate of harvested crop in dependence on time. A camera 94 (which serves as a device for determining the expected rate of crop harvested by the harvesting machine 10), which can be a mono or stereo camera operating in the visible or another frequency range, determines an expected crop throughput 162 as a function of the site by means of a connected image processing system using the images of the crop that is in front of the harvesting attachment 18 that are received by it. Instead of or in addition to a camera 94, it is also possible to use a laser or radar sensor. Alternatively or additionally a position determining device 92 (serving as a device for determining the expected rate of crop acquired by the harvesting machine 10) can establish the current position and direction of travel of the harvesting machine 10, and using data stored in a map 158, which were obtained in previous harvesting operations or during the period of growth of the crop or in adjacent passes over the field by the harvesting machine 10 or another harvesting machine in the current harvesting operation, can provide an expected crop throughput 162 as a function of the site. Said expected, site-dependent crop throughput 162 is sent to the conversion unit 106 of a calculator 120.

The conversion device 106 additionally receives the sequence 156 of absolute speeds from the speed setting device 102 and a part or all of the described measured and/or calculated quantities 134 that are dependent on the relevant operating state of the harvesting machine 10, which quantities are sent altogether to a speed calculation model 116. The speed calculation model 116 calculates, by means of the data sent to it and possibly other known parameters (which can, for example, come from speed model 124), a sequence 164 of the (actual) expected speeds of the harvesting machine 10. Said sequence 164 is then integrated in a distance calculator 118 and a sequence 166 is output of expected sites, which likewise is sent to the calculation unit 120. The latter then calculates by means of sequence 166 and the throughputs 162 associated with the relative sites, the time-dependent prediction 132 of the rate of harvested crop.

The described operations are repeated in timewise successive steps. In doing so the parameters of the path model in the machine modeling module 112 and/or in speed calculation model 116 are actualized in each or many a repetition step, based on the registered measured quantities, which are sent to the machine modeling module 112 or the speed calculation model 116.

Having described one or more embodiments, it will become apparent that various modifications can be made without departing from the scope of the invention as defined in the accompanying claims. Further embodiments of the invention may include any combination of features from one or more dependent claims, and such features may be incorporated, collectively or separately, into any independent claim.

The following is claimed:

1. A system for automatic control of a propulsive speed of a harvesting machine, the system comprising:
    a throughput sensor to obtain data pertaining to an area, the data for determining an expected rate of crop harvested by the harvesting machine based on crop of the area yet to be harvested by the harvesting machine;
    a conversion processor configured to:
        calculate a sequence of expected positions of the harvesting machine; and
        determine, using the expected rate of crop harvested, a predicted rate of crop harvested by the harvesting machine at the sequence of expected positions of the harvesting machine; and
    a speed control processor configured to:
        receive data relating to the predicted rate of crop harvested at the sequence of expected positions; and
        utilize a cost function that assigns costs to machine states of the harvesting machine, the cost function to be utilized to calculate the costs based on:
            (i) an achieved quality of the crop harvested,
            (ii) a workload of a drive engine of the harvesting machine, and
            (iii) the predicted rate of crop harvested; and
        generate at least one timewise successive sequence of speed commands for setting the propulsive speed of the harvesting machine for at least two different upcoming times based on the costs associated with the cost function; and
    an actuator configured to adjust the propulsive speed of the harvesting machine based on the at least one timewise successive sequence.

2. The system of claim 1, wherein the conversion processor is configured to calculate the sequence of the expected positions of the harvesting machine and the predicted rate of harvested crop in dependence on time or site.

3. The system of claim 2, wherein the conversion processor is configured to calculate a time-dependent sequence of expected positions of the harvesting machine based in part on the sequence of speed commands for setting the propulsive speed of the harvesting machine that exists in each case and determining at least one operating state of the harvesting machine.

4. The system of claim 3, wherein the speed control processor is configured to take into account at least one of a measured or observed machine state in determining the operating state of the harvesting machine.

5. The system of claim 4, wherein the speed control processor is configured to use at least one of a current rate of crop harvested by the harvesting machine or a workload of a drive engine of the harvesting machine in determining the operating state of the harvesting machine.

6. The system of claim 5, wherein the speed control processor is configured to optimize the cost function by using a predictive time period and output and input quantities of the harvesting machine to generate predicted operating states and output quantities for the predictive time period, and outputting the input quantity of to the actuator control device as an optimized operating quantity.

7. The system of claim 5, further comprising a disturbance processor to detect possible deviations between an expected rate of the harvested crop and the actual rate of the harvested crop and sending the deviations as an input to the cost function.

8. The system of claim 6, wherein the speed control processor is configured to take into account at least one of a maximum crop throughput, maximum harvesting losses, an available drive power, a maximum acceleration, a maximum time derivative of the acceleration or a maximum propulsive speed as a limitation of the input quantities.

9. The system of claim 1, wherein the speed control processor comprises a machine modeling processor configured to estimate at least one quantity representing an operating state of the harvesting machine or a quantity representing physical properties of the harvesting machine and use the quantity in solving an optimization problem.

10. The system of claim 9, further comprising an operator input device, with which a weighting of the quantities corresponding to the operating state of the harvesting machine or driver comfort are to be performed, the weighted quantities are utilized by the speed control processor in solving the optimization problem.

11. A method for controlling a propulsive speed of a harvesting machine, the method comprising:
    determining, based on sensor data pertaining to an area, a predicted rate of crop to be harvested by the harvesting machine at a sequence of expected positions of the harvesting machine;
    assigning, via a cost function, costs to machine states of the harvesting machine, the costs calculated based on:
        (i) an achieved quality of the crop harvested,
        (ii) a workload of a drive engine of the harvesting machine, and (iii) the predicted rate of crop harvested by the harvesting machine;

generating, upon assigning the costs, at least one timewise successive sequence of speed commands for setting the propulsive speed of the harvesting machine for at least two different upcoming times based on the costs associated with the cost function; and adjusting the propulsive speed of the harvesting machine based on the at least one timewise successive sequence of speed commands.

12. The method of claim 11, further comprising:

receiving an expected rate of crop harvested by the harvesting machine for an initial position of the harvesting machine; and calculating the sequence of expected positions of the harvesting machine.

13. The method of claim 11, wherein the cost function is optimized by weighting at an operator interface, quantities corresponding to at least one of an operating state of the harvesting machine or driver comfort.

14. The method of claim 13, wherein the cost function is optimized by associating desired operating states with lower costs and undesired operating states with higher costs.

15. The method of claim 13, wherein the quantities correspond to a measurement from at least one of a grain loss sensor, a return sensor, a speed sensor, or a hydraulic pressure sensor.

16. The method of claim 13, wherein the quantities is a secondary condition relating to at least one of maximum crop throughput, maximum harvesting loss, an available drive power, a maximum acceleration, a maximum time derivative of the acceleration or a maximum propulsive speed as a limitation of the quantities.

17. The method of claim 12, further comprising identifying deviations between an expected rate of harvested crop and the actual rate of harvested crop and correcting the cost function based on the deviations.

18. The method of claim 17, further comprising determining deviations between expected and actual rates of harvested crop using signals from a hydraulic pressure sensor and a speed signal.

19. A harvesting machine comprising:
a drive for powering the harvesting machine;
a throughput sensor to obtain data pertaining to an area, the data for determining, at a first time, an expected rate of crop harvested by the harvesting machine based on crop to be harvested by the harvesting machine at a second time, the second time later than the first time;

a conversion processor configured to:
calculate a sequence of expected positions of the harvesting machine, and
determine, based on the expected rate of crop harvested, a predicted rate of crop harvested by the harvesting machine at the sequence of expected positions of the harvesting machine;

a speed control processor configured to:
receive data relating to the predicted rate of crop harvested at the sequence of expected positions,
utilize a cost function that assigns costs to machine states of the harvesting machine, the cost function to be utilized to calculate the costs based on:
(i) an achieved quality of the crop harvested,
(ii) a workload of a drive engine, and
(iii) the predicted rate of crop harvested, and
generate, based on the calculated costs associated with the cost function, at least one timewise successive sequence of speed commands for setting a propulsive speed of the harvesting machine for at least two different upcoming times; and an actuator configured to adjust the propulsive speed of the harvesting machine based on the at least one timewise successive sequence.

20. The system of claim 1, wherein the data includes at least one of a gradient of a terrain in a forward direction or a gradient of the terrain in a transverse direction.

21. The system of claim 1, further including an operator input device to control an acceleration of the harvesting machine based on a driving comfort of an operator.

22. The system of claim 1, wherein the propulsive speed of the harvesting machine is based on an acceleration of the harvesting machine.

23. The system of claim 1, wherein the data pertaining to the area is stored in a map.

24. The system of claim 23, wherein the map is based on a previous harvesting operation of a field.

25. The system of claim 23, wherein the data pertaining to the area is site-dependent crop throughput stored on the map.

* * * * *